United States Patent

Keith

[15] 3,648,696
[45] Mar. 14, 1972

[54] TEAT SPRAYING APPARATUS FOR AIDING IN THE PREVENTION OF MASTITIS IN DAIRY COWS

[72] Inventor: Robert H. Keith, 2012 Roosevelt Road, Monroe, Wis. 53566

[22] Filed: Mar. 20, 1970

[21] Appl. No.: 21,314

[52] U.S. Cl. ................................... 128/248, 119/1, 128/260
[51] Int. Cl. ........................................................ A61n 11/02
[58] Field of Search ..................... 119/1, 14.47; 128/248, 66, 128/260

[56] References Cited

UNITED STATES PATENTS

| 3,366,111 | 1/1968 | Gandier | 119/14.47 X |
| 2,532,088 | 11/1950 | Cordis | 119/1 |
| 2,839,052 | 6/1958 | Verch et al. | 128/248 X |
| 3,288,140 | 11/1966 | McCarthy | 128/248 |

Primary Examiner—Hugh R. Chamblee
Attorney—Joseph G. Werner, Theodore J. Long, John M. Winter and James A. Kemmeter

[57] ABSTRACT

Method and apparatus for spraying disinfectant on the end of the teats of dairy cows. After milking, the teat is inserted into the top end of a tubular shroud which encircles a spray nozzle connected by an elongate rigid conduit to a pressurizing device. The teat end is then sprayed with disinfectant by triggering the hand-held pressurizing device. The shroud has an inwardly baffled upper end and drainage holes in the bottom end adjacent the nozzle.

3 Claims, 3 Drawing Figures

Patented March 14, 1972

3,648,696

INVENTOR.
ROBERT H. KEITH
BY Joseph G. Werner
John M. Winter
ATTORNEYS 3,648,696

TEAT SPRAYING APPARATUS FOR AIDING IN THE PREVENTION OF MASTITIS IN DAIRY COWS

BACKGROUND OF THE INVENTION

1. Field of the Invention

My invention relates to the general class of animal husbandry and more specifically to a method and teat spraying apparatus for aiding in the prevention of mastitis in dairy cows.

2. State of the Art

The application of an efficacious disinfectant to the teat following milking has been shown to be an important factor in the prevention of mastitis in dairy cows. *Journal of the American Veterinary Medical Association*, Volume 155, July 15, 1969; Number 2, Part 1, "Recent Developments in Mastitis Control," page 157.

The drop of milk that remains on the teat orifice after milking acts as an incubator where bacteria multiply quickly and enter the streak canal following the milking process. It has been established that nearly all of the 20 different types of pathogenic organisms isolated from infected cows enter the udder through the teat orifice and streak canal.

At the present time the art teaches that dipping the teat in a cup of liquid disinfectant is the best known way of preventing bacteria from entering the teat orifice and canal. *Hoard's Dairyman*, July 25, 1969, "Teat Dipping and Dry Cow Treatment," page 824; *Hoard's Dairyman*, Nov. 10, 1969, "Hoard's Dairyman Round Table: Latest on Mastitis Control," page 1,240; and *The Bovine Practitioner*, Oct., 1969, "Mastitis Control - Where do we Stand?", page 2.

In addition to the above mentioned publications showing the present state of the art, the following patents relate to apparatus for applying liquids to the udders of dairy cattle: Newell U.S. Pat. No. 2,523,478; Cordis U.S. Pat. No. 2,532,088; Jansen U.S. Pat. No. 2,732,300; and Lyttle U.S. Pat. No. 3,174,457.

SUMMARY OF THE INVENTION

Basically my invention comprises a method and manually operable apparatus for treating the teats of dairy cows with a disinfectant solution for aiding mastitis prevention.

After each milking, the cows teats are successively inserted into a open-topped tubular shroud encircling a spray nozzle which is connected by an elongate substantially rigid conduit to a trigger actuated pressurizing mechanism. The teat end is sprayed with a disinfectant solution by squeezing the trigger of the hand-held pressurizing mechanism. The shroud has an inwardly baffled upper end for retaining the sprayed solution within the shroud. The shroud is also provided with drainage holes in the bottom adjacent the nozzle.

My invention is believed to be a considerable advance over the dipping procedure presently being practiced. First, there is no contamination from teat to teat because the sprayed disinfectant solution is used only once and then drained from the apparatus whereas in the dipping procedure, the teats are all dipped in the same cup of solution.

There also will be less chapping in comparison with teat dipping because only the orifice and teat end are sprayed with solution while in the dipping procedure, substantially the entire teat is immersed in the solution.

My method is considerably faster, easier and more sanitary than the known dipping method because it eliminates the handling of an open, liquid-filled cup. Further, the solution is maintained in a closed container which eliminates spilling and keeps it free of air borne bacteria, falling debris, dirt, feces and urine.

Further objects, features and advantages of my invention will be apparent from the following detailed description taken in conjunction with the accompanying drawing showing a preferred embodiment of my invention.

DETAILED DESCRIPTION OF A PREFERRED EMBODIMENT

Figure 1:
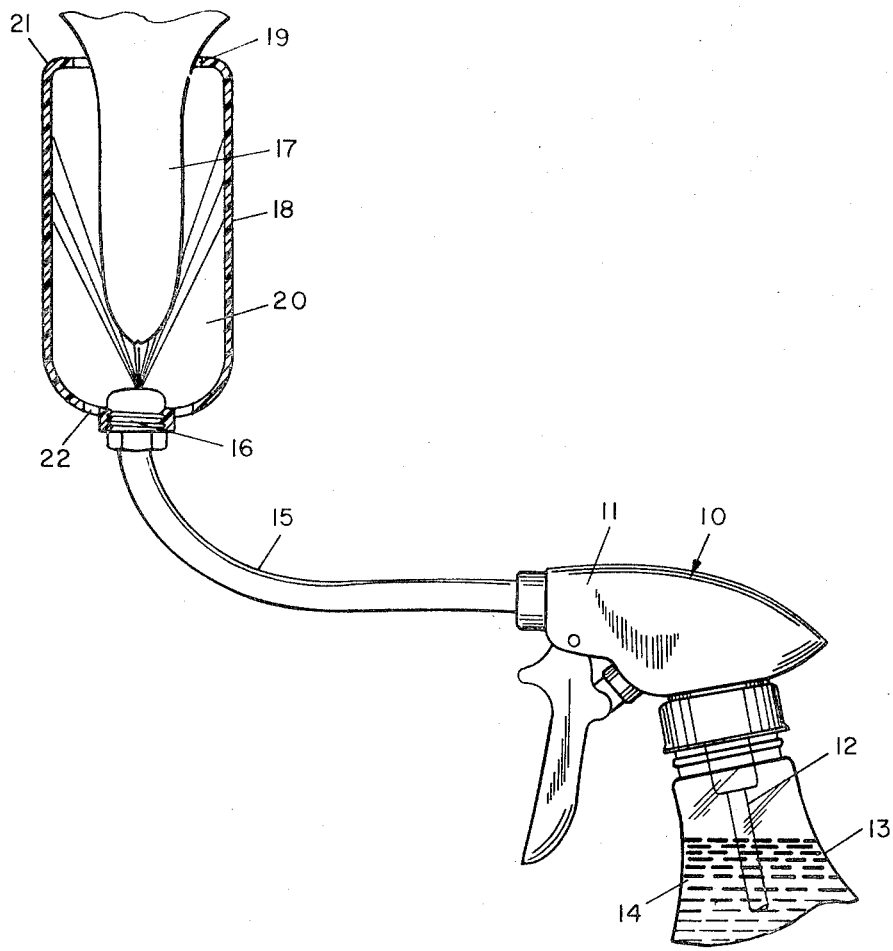
FIG. 1 is an elevation view showing apparatus embodying my invention as it is used to spray a cow's teat.

Referring now more particularly to the drawings wherein like numerals refer to like parts throughout the several views, my spray device is designated generally by numeral 10 in FIG. 1. The device has a trigger operated pressurizing mechanism 11 which may be of conventional design. The pressurizing mechanism has an intake tube 12 extending into a reservoir, in this case, bottle 13 of disinfectant solution 14. The trigger operated pressurizing mechanism and bottle are adapted to be held in one hand and the trigger squeezed with the fingers to dispense the disinfectant. The pressurizing mechanism has an elongate connecting tube 15 extending forwardly and curving upwardly therefrom.

Figure 2:
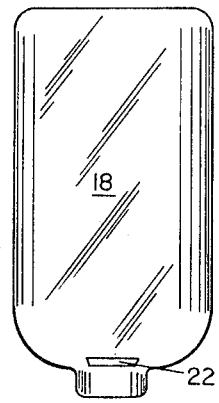
FIG. 2 is an elevation view of the shroud portion of the apparatus which is shown in section in FIG. 1.
Figure 3:
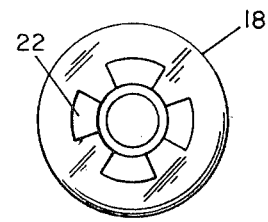
FIG. 3 is a bottom view of the shroud portion of the apparatus.

A spray nozzle 16 is secured on the end of the tube 15 for spraying the disinfectant solution upwardly toward the end of the teat 17 of a dairy cow as shown in FIG. 1. The nozzle is encircled by a tubular shroud 18, a preferred form of which is shown in FIGS. 1-3. As shown therein, the shroud has an orifice 19 in its top end through which the cow's teat is received in spaced relation in the shroud chamber 20.

The upper edge of the shroud has an inwardly turned flange or baffle 21 which defines the teat receiving orifice 19. The baffle serves to center the cow's teat in the shroud chamber and to deflect and retain the disinfectant within the shroud during spraying. The shroud should be of sufficient length so that the teat end will be positioned a short distance above the spray nozzle as shown in FIG. 1. This will permit the spray jet of disinfectant solution to be directed to the teat orifice and area immediately surrounding the orifice without bathing the whole teat.

The excess spray within the shroud chamber will run down the wall of the shroud and be discharged through drain holes 22 formed in the bottom of the shroud adjacent the nozzle.

The pressurizing mechanism 11, tube 15, nozzle 16, and the shroud 18 may be made of any suitable, substantially rigid material, such as plastic or the like.

The upwardly curved connecting tube 15 should be made of sufficiently rigid material so as to support the shroud in substantially fixed spaced relation with the hand-held pressurizing mechanism. The forwardly and upwardly curved connecting tube makes the device particularly convenient and easy to use because the operator need not stoop and reach his hand under the cow's udder as is necessary with the liquid-filled dipping cups presently being used.

While a generally cylindrical shaped shroud 18 is shown in the drawings, other shapes such as conical or the like can be satisfactorily employed.

The connecting tube 15 can also be made to extend backwardly somewhat at its upper end, which some operators may find more convenient for them to use.

It should be understood that my invention is not confined to the particular construction and arrangement of parts herein illustrated and described, but embraces all such modified forms thereof as come within the scope of the following claims.

I claim:

1. A hand-held teat spraying apparatus for aiding mastitis prevention in dairy cows, comprising:
   a. a bottle for holding liquid disinfectant and providing a handle for the operator,
   b. a nozzle for spraying liquid disinfectant,
   c. pressurizing means mounted on said bottle for supplying liquid disinfectant to said nozzle and having a finger operable trigger extending downwardly at the front of said bottle,
   d. a rigid tubular conduit connecting said finger trigger operated pressurizing means with said nozzle for supporting said nozzle in substantially fixed spaced relation with said pressurizing means and for carrying liquid disinfectant from said pressurizing means to said nozzle, e. an elongate tubular shroud fixedly mounted on said tubular conduit and encircling said nozzle in the bottom thereof, said shroud having an orifice in the inwardly turned upper end thereof through which the end of a cow's teat is positioned in spaced relation with the wall of said shroud and above said nozzle.

2. The hand-held teat spraying apparatus as specified in claim 1 wherein the upright axes of said shroud and said bottle converge at a point above said bottle.

3. The hand-held teat spraying apparatus as specified in claim 1 having a drainage opening in the bottom end of said shroud adjacent said nozzle.

* * * * *